(12) United States Patent
Ishioka et al.

(10) Patent No.: US 11,485,420 B2
(45) Date of Patent: Nov. 1, 2022

(54) VEHICLE FRAME STRUCTURE (71) Applicant: TOYOTA JIDOSHA KABUSHIKI KAISHA, Aichi-ken (JP)

(72) Inventors: Hirotaka Ishioka, Toyota (JP); Yasuhiro Hara, Nagoya (JP); Norimasa Koreishi, Miyoshi (JP); Jumpei Watanabe, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 49 days.

(21) Appl. No.: 17/075,696

(22) Filed: Oct. 21, 2020

(65) Prior Publication Data
US 2021/0129914 A1 May 6, 2021

(30) Foreign Application Priority Data
Nov. 5, 2019 (JP) .............................. JP2019-200968

(51) Int. Cl.
| | |
|---|---|
| *B62D 25/08* | (2006.01) |
| *B62D 21/15* | (2006.01) |
| *B62D 47/00* | (2006.01) |
| *B62D 25/20* | (2006.01) |
| *B62D 31/00* | (2006.01) |

(52) U.S. Cl.
CPC ........... *B62D 25/08* (2013.01); *B62D 21/152* (2013.01); *B62D 25/20* (2013.01); *B62D 31/00* (2013.01); *B62D 47/00* (2013.01)

(58) Field of Classification Search
CPC ...... B62D 25/08; B62D 21/152; B62D 47/00; B62D 21/00; B62D 25/20
USPC ..................................................... 296/187.03
See application file for complete search history.

(56) References Cited

U.S. PATENT DOCUMENTS

| | | | |
|---|---|---|---|
| 9,039,060 B1 * | 5/2015 | Yamamoto | ............... B60N 2/36 296/183.1 |
| 2015/0061320 A1 * | 3/2015 | Yabu | ....................... B60R 19/24 293/133 |

FOREIGN PATENT DOCUMENTS

| | | |
|---|---|---|
| JP | H11105748 A | 4/1999 |
| JP | 2008137419 A | 6/2008 |

* cited by examiner

Primary Examiner — D Glenn Dayoan
Assistant Examiner — Dana D Ivey
(74) Attorney, Agent, or Firm — Hauptman Ham, LLP (57) ABSTRACT

A vehicle frame structure includes a front wall portion and a rear wall portion that are respectively provided in front and rear end portions of a vehicle, a side wall portion extending in the vehicle front-rear direction so as to separate the vehicle cabin from the exterior of the vehicle cabin, and a connecting portion that includes a first end portion and a second end portion, and has a closed section structure that is curved so as to protrude inward in the vehicle width and front-rear directions in a plan view. The first end portion is connected to an inner side of one of the front wall portion and the rear wall portion in the vehicle front-rear direction, and the second end portion is connected to an inner side of the side wall portion in the vehicle width direction.

7 Claims, 5 Drawing Sheets

VEHICLE FRAME STRUCTURE

INCORPORATION BY REFERENCE

The disclosure of Japanese Patent Application No. 2019-200968 filed on Nov. 5, 2019 including the specification, drawings and abstract is incorporated herein by reference in its entirety.

BACKGROUND

1. Technical Field

The disclosure relates to a vehicle frame structure.

2. Description of Related Art

Japanese Unexamined Patent Application Publication No. 11-105748 (JP 11-105748 A) discloses a vehicle front portion structure of a small-size bus including a front panel serving as a front wall portion of a vehicle and side panels serving as side wall portions of the vehicle. In the vehicle front portion structure above, a flange is provided on a front pillar, and the front panel and the side panel are connected via the flange, thereby improving assembly workability.

SUMMARY

With the vehicle frame structure of the vehicle including the front panel and the side panel as in the vehicle front portion structure described in JP 11-105748 A, it is possible to ensure a large space in a vehicle cabin. On the other hand, a structure that suppresses entry of the front panel and the side panel into the vehicle cabin when a collision occurs is required. Therefore, there is a room for improvement from the viewpoint of improving a collision safety performance.

The disclosure provides a vehicle frame structure capable of improving the collision safety performance while ensuring a space in the vehicle cabin.

A vehicle frame structure according to an aspect of the disclosure includes: a front wall portion and a rear wall portion that are respectively provided in a front end portion and a rear end portion of a vehicle and that extend in a vehicle width direction and a vehicle up-down direction so as to separate a vehicle cabin from an exterior of the vehicle cabin; a side wall portion extending in a vehicle front-rear direction between an end portion of the front wall portion and an end portion of the rear wall portion in the vehicle width direction so as to separate the vehicle cabin from the exterior of the vehicle cabin; and a connecting portion including a first end portion and a second end portion, and including a closed section structure that is curved so as to protrude inward in the vehicle width direction and inward in the vehicle front-rear direction when viewed in a plan view. The first end portion is connected to an inner side of one of the front wall portion and the rear wall portion in the vehicle front-rear direction, and the second end portion is connected to an inner side of the side wall portion in the vehicle width direction.

According to the aspect above, the front wall portion and the rear wall portion are respectively provided in the front end portion and the rear end portion of the vehicle, and extend in the vehicle width direction and in the vehicle up-down direction so as to separate the vehicle cabin from the exterior of the vehicle cabin. Further, the side wall portion extends in the vehicle front-rear direction between the end portions of the front wall portion and the rear wall portion in the vehicle width direction so as to separate the vehicle cabin from the exterior of the vehicle cabin. Separating the vehicle cabin from the exterior of the vehicle cabin using the front wall portion, the rear wall portion, and the side wall portion makes it possible to ensure a large space in the vehicle cabin.

Further, the first end portion of the connecting portion is connected to the inner side of one of the front wall portion and the rear wall portion in the vehicle front-rear direction, and the second end portion of the connecting portion is connected to the inner side of the side wall portion in the vehicle width direction. With this configuration, the connecting portion connects one of the front wall portion and the rear wall portion, and the side wall portion. Here, the connecting portion is curved so as to protrude inward in the vehicle width direction and inward in the vehicle front-rear direction when viewed in a plan view. With this configuration, when the vehicle collides, a collision load is suppressed from being locally concentrated on the connecting portion, and the collision load is mutually transmitted between the front wall portion or the rear wall portion and the side wall portion via the connecting portion, thereby suppressing the front wall portion or the rear wall portion and the side wall portion from entering the vehicle cabin. The term "curved" here is not limited to a completely curved configuration, and is a concept that broadly includes a curved shape as a whole that connects linear portions.

According to the aspect above, at least one of the front wall portion and the rear wall portion may be provided with a reinforcing portion that has a closed section structure and extends in the vehicle width direction. The side wall portion may be provided with a side reinforcing portion that has a closed section structure and extends in the vehicle front-rear direction. The connecting portion may include the first end portion connected to the reinforcing portion and the second end portion connected to the side reinforcing portion.

With the configuration above, the first end portion of the connecting portion is connected to the reinforcing portion having the closed section structure, and the second end portion of the connecting portion is connected to the side reinforcing portion having the closed section structure. Accordingly, the collision load can be smoothly transmitted between the reinforcing portions having the closed section structure.

According to the aspect above, the connecting portion may be disposed in a front portion of the vehicle, and connect the front wall portion provided in the front end portion of the vehicle and the side wall portion.

With the aspect above, the connecting portion connects the front wall portion provided in the front end portion of the vehicle and the side wall portion, which can suppress deformation of the front portion of the vehicle particularly when a front collision occurs.

According to the aspect above, a pair of connecting portions may be provided on respective sides of the vehicle in the vehicle width direction with a vehicle seat interposed between the connecting portions.

With the configuration above, even when the vehicle seat is disposed in the front portion of the vehicle, the front wall portion, the rear wall portion, and the side wall portion can be suppressed from entering the vehicle cabin when the vehicle collides, which can protect an occupant seated on the vehicle seat.

According to the aspect above, a functional component of the vehicle may be housed in an area that is surrounded by the one of the front wall portion and the rear wall portion, the side wall portion, and the connecting portion connected to the one of the front wall portion and the rear wall portion.

With the configuration above, the functional components can be collectively housed by housing the functional components in the area surrounded by the one of the front wall portion and the rear wall portion, the side wall portion, and the connecting portion. Accordingly, reduction of an internal space of the vehicle cabin can be suppressed compared to the configuration in which the functional components are disposed in a dispersed manner.

According to the above aspect of the disclosure, the collision safety performance can be improved while ensuring the space in the vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle frame structure according to an embodiment will be described with reference to the drawings. An arrow FR, an arrow UP, and an arrow RH that are appropriately described in each drawing respectively indicate a front direction, an upward direction, and a right direction of a vehicle. When the description is hereinafter simply made using a front-rear direction, an up-down direction, and a left-right direction, the front-rear direction in a vehicle front-rear direction, the up-down direction in a vehicle up-down direction, and the left-right direction when facing a vehicle front direction are indicated unless otherwise specified.

Figure 1:
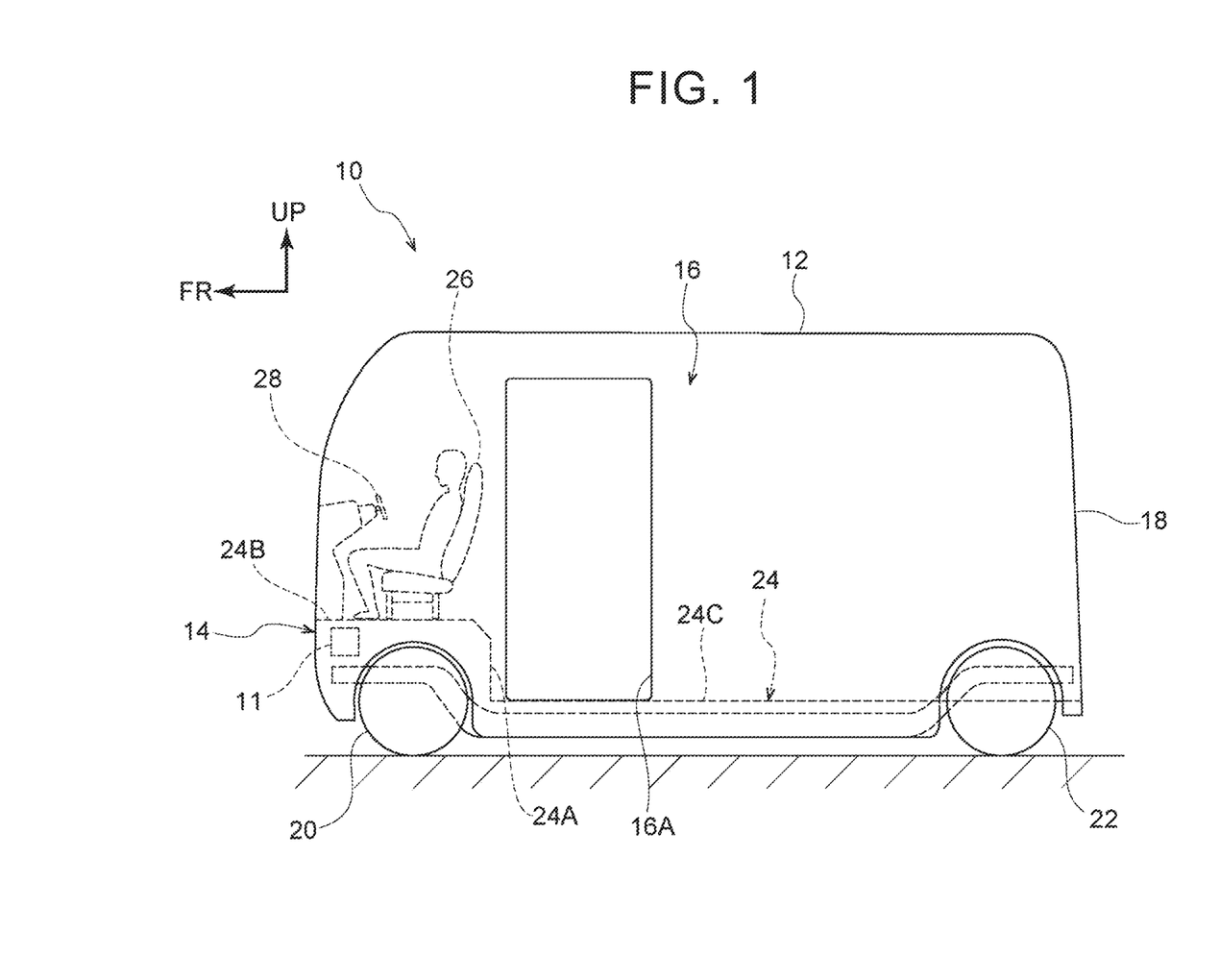
FIG. 1 is a side view showing a main portion of a vehicle to which a vehicle frame structure according to an embodiment is applied.

As shown in FIG. 1, a vehicle 10 to which the vehicle frame structure according to the embodiment is applied is, for example, an electric vehicle used as a commercial vehicle. Driving of the vehicle 10 is switchable between autonomous driving and manual driving. Further, the vehicle 10 has a substantially rectangular parallelepiped shape that is surrounded by a roof 12, a front wall portion 14 serving as front and rear wall portions, side wall portions 16, and a rear wall portion 18 serving as the front and rear wall portions. An entrance-exit 16A is provided in a front portion of the side wall portion 16. Further, front wheels 20 are provided in a front portion of the vehicle 10, and rear wheels 22 are provided in a rear portion of the vehicle 10.

Here, a front portion of a floor panel 24 of the vehicle 10 according to the embodiment is higher than a rear portion of the floor panel 24. Specifically, a stepped portion 24A is provided slightly rearward in a vehicle cabin of the vehicle 10 with respect to the front wheels 20. A front floor panel 24B is provided forward in the vehicle cabin of the vehicle 10 with respect to the stepped portion 24A. A center floor panel 24C is provided rearward in the vehicle cabin of the vehicle 10 with respect to the stepped portion 24A. The front floor panel 24B is provided one step higher than the center floor panel 24C.

The front floor panel 24B is provided with a vehicle seat 26 on which a driver can sit. The vehicle seat 26 is located at the center in a vehicle width direction, and a steering wheel 28 is provided forward of the vehicle seat 26 in the vehicle 10. The center floor panel 24C is provided with a plurality of vehicle seats (not shown).

Figure 2:
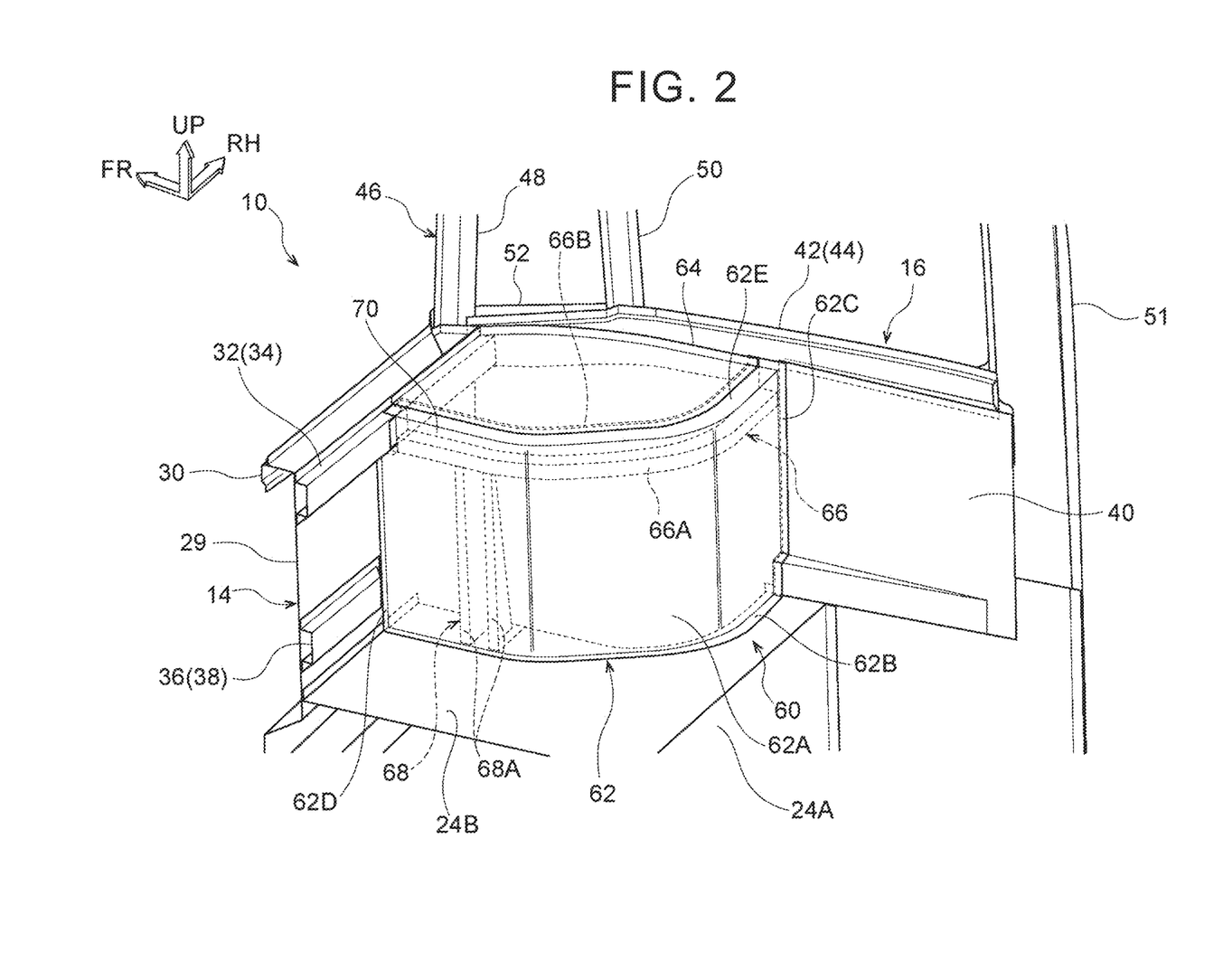
FIG. 2 is a perspective view in which a front portion of the vehicle cabin according to the embodiment is viewed from a diagonally left-rear side.

As shown in FIG. 2, the front wall portion 14 is provided in a front end portion of the vehicle 10 and is configured to include a front panel 29, a front upper reinforcement 32, and a front lower reinforcement 36. The front panel 29 extends in the vehicle width direction and in the vehicle up-down direction with the vehicle front-rear direction as a thickness direction, and the front panel 29 separates the vehicle cabin from an exterior of the vehicle cabin. A right end portion of the front panel 29 is joined to a lower end portion of a front pillar 46, and an upper end portion of the front panel 29 is bent toward a vehicle front side and joined to a cowl panel 30.

The front upper reinforcement 32 is provided on a surface of the upper end portion of the front panel 29 on a vehicle inner side (vehicle rear side). The front upper reinforcement 32 extends in the vehicle width direction and has a substantially hat shaped section that is open to the vehicle front side. Further, upper and lower flange portions of the front upper reinforcement 32 are joined to the front panel 29 in an overlapped state. The front panel 29 and the front upper reinforcement 32 constitute a reinforcing portion 34 having a closed section structure.

The front lower reinforcement 36 is provided on a surface of a lower portion of the front panel 29 on the vehicle inner side (on the vehicle rear side). The front lower reinforcement 36 extends in the vehicle width direction and has a substantially hat shaped section that is open toward the vehicle front side. Further, upper and lower flange portions of the front lower reinforcement 36 are joined to the front panel 29 in an overlapped state. The front panel 29 and the front lower reinforcement 36 constitute a lower reinforcing portion 38 having a closed section structure.

The side wall portion 16 extends from an end portion (an end portion in the vehicle width direction) of the front wall portion 14 toward the vehicle rear side. The side wall portion 16 is provided on each side portion of the vehicle 10, and includes a side panel 40 and a side upper reinforcement 42.

The side panel 40 extends in the vehicle front-rear direction and in the vehicle up-down direction with the vehicle width direction as a thickness direction. The side panel 40 separates the vehicle cabin from the exterior of the vehicle cabin. A front end portion of the side panel 40 is joined to the lower end portion of the front pillar 46, and a rear end portion of the side panel 40 is connected to a center pillar 51.

A side upper reinforcement 42 is provided on a surface of an upper end portion of the side panel 40 on the vehicle inner side (inner side in the vehicle width direction). The side upper reinforcement 42 extends in the vehicle front-rear direction and has a substantially hat shaped section that is open outward in the vehicle width direction. Further, upper and lower flange portions of the side upper reinforcement 42 are joined to the side panel 40 in an overlapped state. The side panel 40 and the side upper reinforcement 42 constitute a side reinforcing portion 44 having a closed section structure.

The front pillar 46 is configured to include a first pillar portion 48, a second pillar portion 50, and a lower connecting portion 52. The first pillar portion 48 is disposed on the vehicle front side. The second pillar portion 50 is disposed on the vehicle rear side with respect to the first pillar portion 48. The lower connecting portion 52 connects lower end portions of the first pillar portion 48 and the second pillar portion 50. The right end portion of the front panel 29 is connected to the first pillar portion 48 of the front pillar 46. The front end portion of the side panel 40 is connected to the second pillar portion 50 of the front pillar 46. Therefore, the front panel 29 and the side panel 40 are connected via the front pillar 46. Although not shown, the left side of the vehicle 10 has a similar structure. That is, a left end portion of the front panel 29 and the side panel 40 on the left side are connected via a left front pillar.

Here, a functional component housing portion 60 is provided in a front and right end portion in the vehicle cabin. The functional component housing portion 60 includes a dash panel 62, an upper cover member 64, a curved reinforcement 66, and a standing wall reinforcing member 68. Although not shown, a similar functional component housing portion is provided in a front and left end portion in the vehicle cabin. Therefore, the functional component housing portions that constitute a pair are provided on respective sides in the vehicle width direction with the vehicle seat 26 interposed therebetween. In the following description, only the functional component housing portion 60 on the right side will be described, and illustration and description of the functional component housing portion on the left side will be omitted.

The dash panel 62 extends in the vehicle up-down direction, and includes a substantially arc shaped curved surface 62A that protrudes toward the inner side in the vehicle width direction and the vehicle rear side (inner side in the vehicle front-rear direction) when viewed in a plan view. The curved surface 62A separates the vehicle cabin from the exterior of the vehicle cabin. A lower flange 62B is provided in a lower end portion of the dash panel 62. The lower flange 62B is bent along the front floor panel 24B. The lower flange 62B is joined to the front floor panel 24B in an overlapped state. The plan view herein indicates a view in which the vehicle is viewed from the above of the vehicle.

A right flange 62C is provided in a right end portion of the dash panel 62. The right flange 62C is bent along the side panel 40. The right flange 62C is joined to the side panel 40 in an overlapped state. A left flange 62D is provided in a left end portion of the dash panel 62. The left flange 62D is bent along the front panel 29. The left flange 62D is joined to the front panel 29 in an overlapped state.

Further, an upper flange 62E is provided in an upper end portion of the dash panel 62. The upper flange 62E is bent toward an outer side of the vehicle cabin. The upper cover member 64 is attached on the upper flange 62E. The upper cover member 64 closes an upper side of the functional component housing portion 60.

The curved reinforcement 66 is provided in the upper end portion of the dash panel 62. The curved reinforcement 66 is provided on a surface of the curved surface 62A on the outer side of the vehicle cabin. The curved reinforcement 66 is curved along the curved surface 62A of the dash panel 62 and has a substantially L-shaped section. A lower flange 66A is provided in a lower end portion of the curved reinforcement 66. The lower flange 66A is bent downward along the curved surface 62A of the dash panel 62, and joined to the curved surface 62A in an overlapped state. Further, an upper flange 66B is provided in an upper end portion of the curved reinforcement 66. The upper flange 66B is bent along the upper flange 62E of the dash panel 62. The upper flange 66B is joined to a lower surface of the upper flange 62E of the dash panel 62 in an overlapped state. As described above, the dash panel 62 and the curved reinforcement 66 constitute a connecting portion 70 having a closed section structure.

Figure 3:
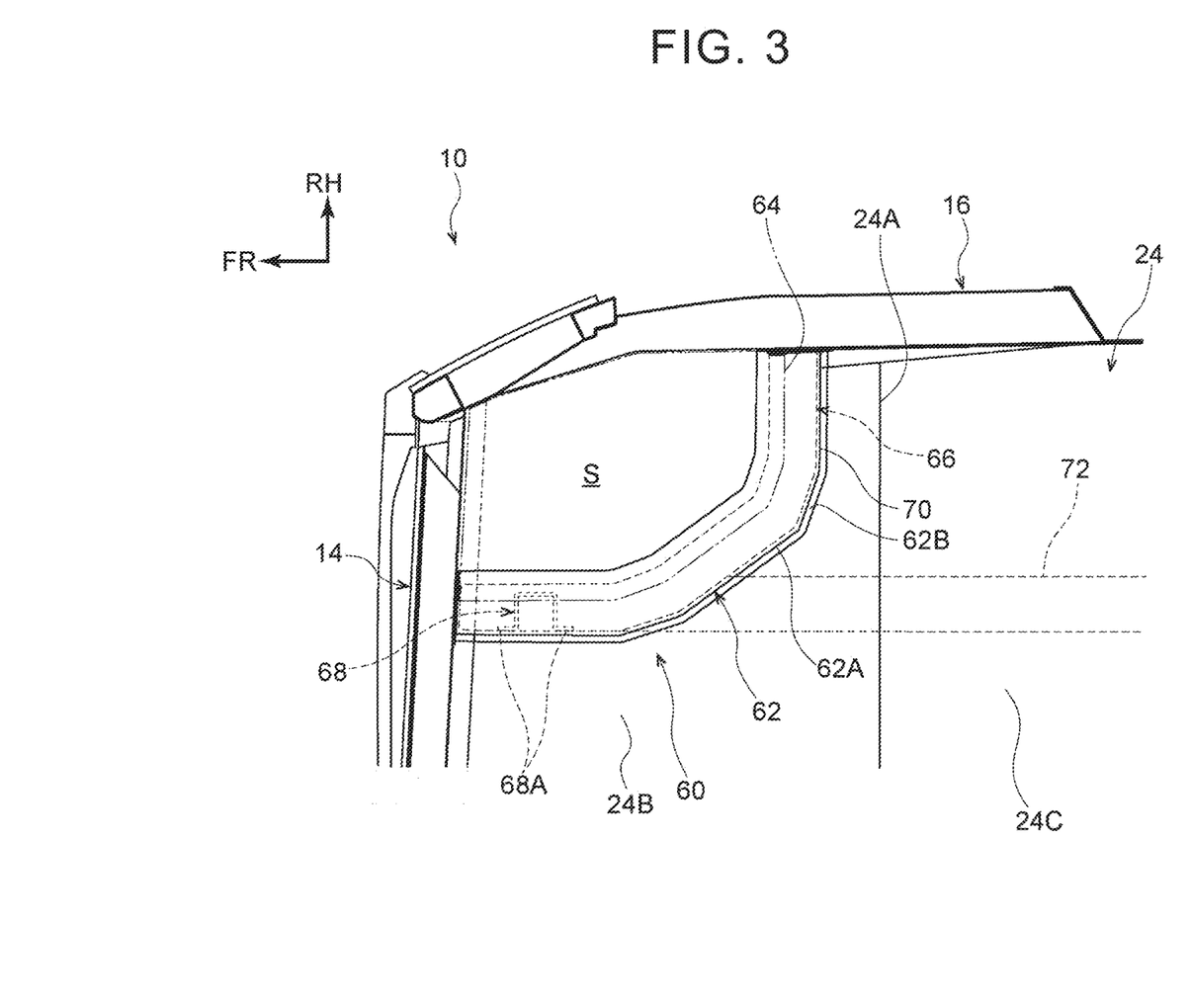
FIG. 3 is a plan view in which a main portion of the vehicle cabin according to the embodiment is viewed from above.

Similar to the dash panel 62, the connecting portion 70 is curved in a substantially arc shape so as to protrude toward the inner side in the vehicle width direction and the vehicle rear side (inner side in the vehicle front-rear direction) when viewed in a plan view. Further, a first end portion of the connecting portion 70 is joined to the front upper reinforcement 32 of the front wall portion 14, and a second end of the connecting portion 70 is joined to the side upper reinforcement 42 of the side wall portion 16. Therefore, the front wall portion 14 and the side wall portion 16 are connected by the connecting portion 70. Then, as shown in FIG. 3, an area S is provided so as to be surrounded by the front wall portion 14, the side wall portion 16, and the connecting portion 70 when viewed in a plan view, and a functional component 11 of the vehicle 10 (refer to FIG. 1) is disposed in the area S. Examples of the functional component 11 disposed in the area S include a headlamp unit, a washer tank, and sensors.

As shown in FIG. 2, the dash panel 62 is provided with the standing wall reinforcing member 68. The standing wall reinforcing member 68 is provided on the curved surface 62A of the dash panel 62 on the outer side of the vehicle cabin and extends in the vehicle up-down direction. The standing wall reinforcing member 68 includes a pair of front and rear flange portions 68A that is joined to the curved surface 62A in an overlapped state. Further, the standing wall reinforcing member 68 projects from the flange portion 68A toward the right side of the vehicle 10, and has a substantially hat shaped section which is opened toward the left side of the vehicle 10 when viewed from above the vehicle. The lower end portion of the standing wall reinforcing member 68 is joined to the front floor panel 24B, and the upper end portion of the standing wall reinforcing member 68 is joined to the curved reinforcement 66. In the embodiment, a length of the standing wall reinforcing member 68 in the vehicle width direction becomes shorter from the lower side toward the upper side of the vehicle 10. With this configuration, the standing wall reinforcing member 68 has a substantially triangular shape when viewed from the vehicle front-rear direction.

As shown in FIG. 3, a floor reinforcement 72 is provided on a lower surface of the floor panel 24. The floor reinforcement 72 extends in the vehicle front-rear direction and is provided continuously with the front floor panel 24B and the center floor panel 24C. The standing wall reinforcing member 68 constituting the functional component housing portion 60 is located above the floor reinforcement 72. That is, the standing wall reinforcing member 68 is connected to the floor reinforcement 72 via the front floor panel 24B.

Operation

Next, an operation of the embodiment will be described.

In the vehicle frame structure according to the embodiment, as shown in FIG. 2, the dash panel 62 and the curved reinforcement 66 constitute the connecting portion 70 having a closed section structure. The first end portion of the connecting portion 70 is connected to the inner side of the front wall portion 14 in the vehicle front-rear direction. Further, since the second end portion of the connecting portion 70 is connected to the inner side of the side wall portion 16 in the vehicle width direction, the front wall portion 14 and the side wall portion 16 are connected by the connecting portion 70. With this configuration, when the vehicle collides, a collision load is suppressed from being locally concentrated on the connecting portion 70, and the collision load can be mutually transmitted between the front wall portion 14 and the side wall portion 16 via the connecting portion 70, thereby suppressing the front wall portion 14 and the side wall portion 16 from entering the vehicle cabin. Consequently, a collision safety performance can be improved.

Figure 4:
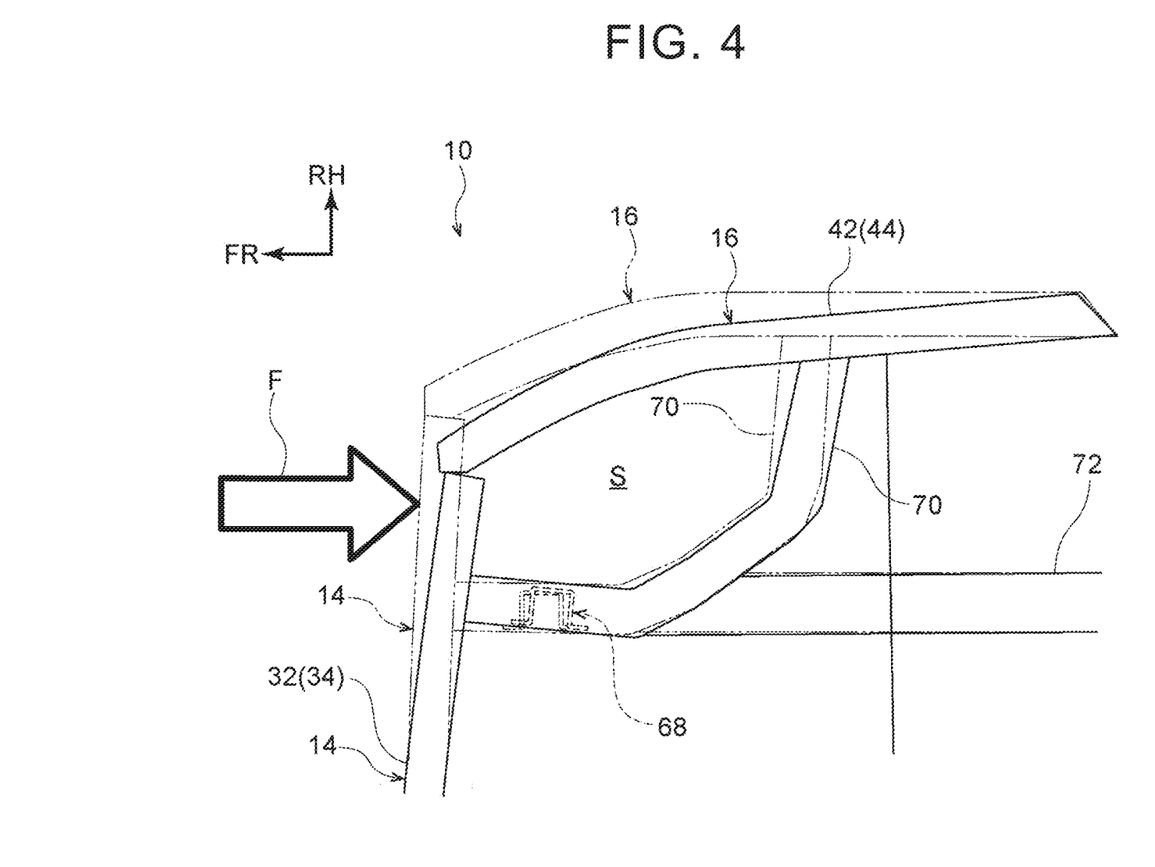
FIG. 4 is a model diagram showing a deformation state of the front portion of the vehicle when a collision load is input to the vehicle to which the vehicle frame structure according to the embodiment is applied.

The above operation will be described with reference to the drawings in comparison with a comparative example. FIG. 4 is a model diagram showing only a main portion of the vehicle 10 to which the vehicle frame structure according to the embodiment is applied. Further, in FIG. 4, a state before the collision load is input is indicated by chain double-dashed lines.

As shown in FIG. 4, when a collision load F is input to the vehicle 10 from the vehicle front side, the collision load F is transmitted from the front upper reinforcement 32 (reinforcing portion 34) of the front wall portion 14 to the side upper reinforcement 42 (side reinforcing portion 44) of the side wall portion 16 via the connecting portion 70. As described above, a collision load is smoothly transmitted between the reinforcing portion 34 and the side reinforcing portion 44 both having the closed section structure, which can suppress a deformation of the front portion of the vehicle 10.

Further, in the embodiment, the curved reinforcement 66 (connecting portion 70) and the floor reinforcement 72 are connected via the standing wall reinforcing member 68. With this configuration, a part of the collision load F input from the front upper reinforcement 32 to the connecting portion 70 is transmitted to the floor reinforcement 72 via the standing wall reinforcing member 68. Accordingly, the collision load can be dispersed and the deformation of the front portion of the vehicle 10 can be further suppressed.

In addition, at the time of a side collision of the vehicle 10, a collision load is transmitted from the side upper reinforcement 42 to the front upper reinforcement 32 and the floor reinforcement 72 via the connecting portion 70, which can suppress the deformation of the front portion of the vehicle 10.

Figure 5:
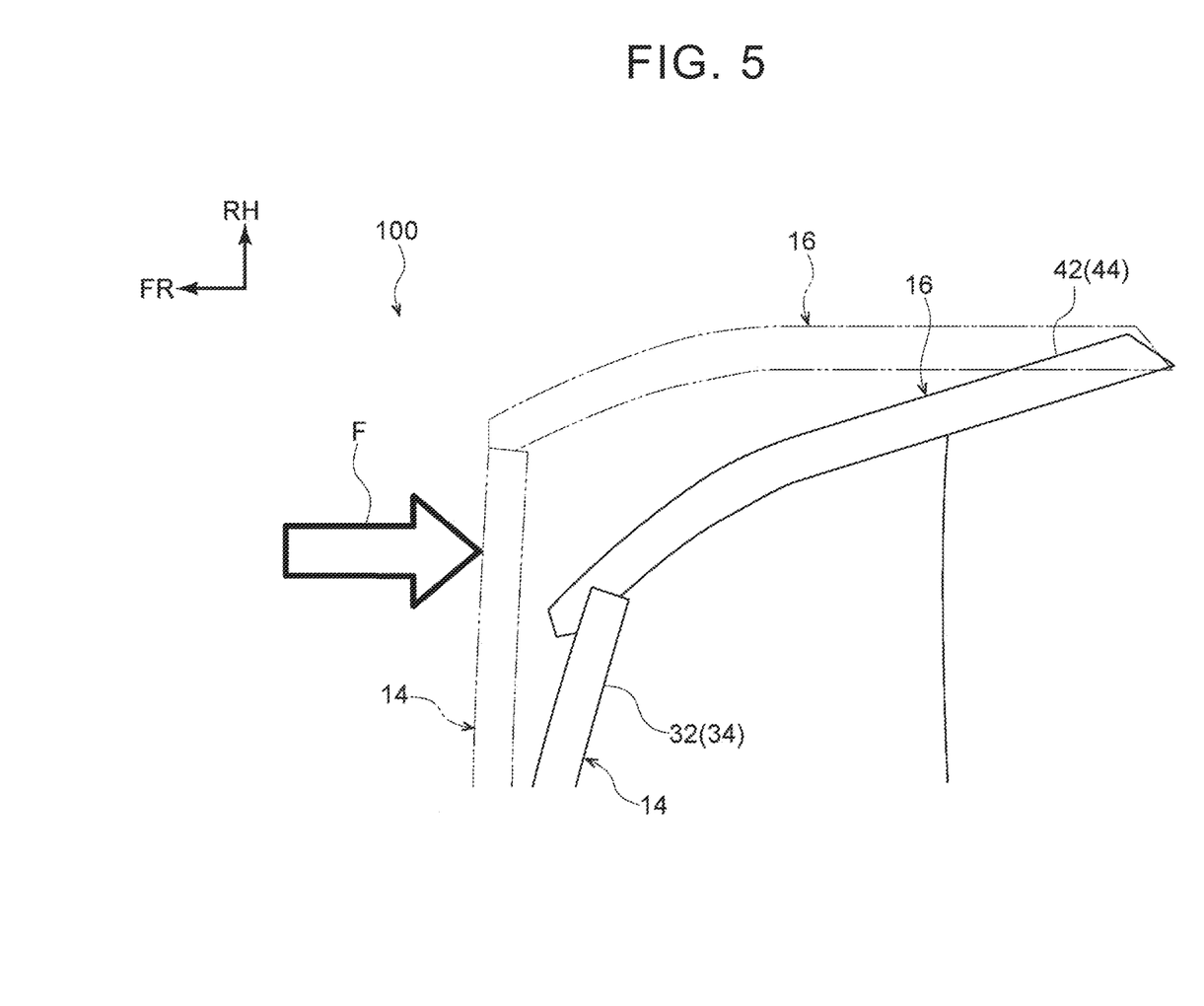
FIG. 5 is a model diagram showing the deformation state of the front portion of the vehicle when the collision load is input to the vehicle of a comparative example.

On the other hand, FIG. 5 shows a vehicle 100 of a comparative example. The vehicle 100 of the comparative example does not include the functional component housing portion 60. Therefore, the vehicle 100 does not include the connecting portion 70 and the standing wall reinforcing member 68 as well. Other configurations are similar to those of the vehicle 10 of the embodiment.

As shown in FIG. 5, when the collision load F is input to the vehicle 100 from the vehicle front side, a force toward the vehicle rear side acts on the front upper reinforcement 32 of the front wall portion 14. Here, since the vehicle 100 of the comparative example does not include a connecting portion that connects the front upper reinforcement 32 and the side upper reinforcement 42, the front upper reinforcement 32 and the side upper reinforcement 42 are displaced backward, and the front portion of the vehicle 100 is greatly deformed toward the vehicle cabin.

As described above, the vehicle 10 according to the embodiment that includes the connecting portion 70 can suppress the deformation of the front portion of the vehicle 10 as compared with the vehicle 100 of the comparative example that does not include the connecting portion 70.

In addition, in the embodiment, the functional component housing portions that constitute a pair are provided on respective sides in the vehicle width direction with the vehicle seat 26 interposed therebetween. Therefore, the connecting portions 70 that constitute a pair are provided in the vehicle width direction with the vehicle seat 26 interposed therebetween. With this configuration, even when the vehicle seat 26 is disposed in the front portion of the vehicle 10, the front wall portion 14 and the side wall portion 16 can be suppressed from entering the vehicle cabin when the vehicle 10 collides, which can protect an occupant seated on the vehicle seat 26. In other words, a seat of the driver can be disposed in the front portion of the vehicle while ensuring the collision safety performance of the vehicle.

Further, in the embodiment, by housing the functional component 11 in the area S that is surrounded by the front wall portion 14, the side wall portion 16, and the connecting portion 70, a plurality of the functional components can be collectively housed in the area S. Consequently, reduction of an internal space of the vehicle cabin can be suppressed compared to the configuration in which the plurality of functional components 11 is disposed in a dispersed manner. Further, the connecting portion 70 can suppress the space in the area S from being crushed when the vehicle 10 collides, which can suppress a damage applied to the functional component 11.

Although the embodiment has been described above, the embodiment can be implemented in various modes without departing from the scope of the disclosure. For example, in the embodiment described above, the functional component housing portion 60 is provided in the front portion of the vehicle 10, and the front wall portion 14 and the side wall portion 16 are connected by the connecting portion 70 that constitutes the functional component housing portion 60. However, the disclosure is not limited to this. A similar functional component housing portion may be provided in a rear portion of the vehicle. Connection of the rear wall portion 18 and the side wall portion by the connecting portion that constitutes the functional component housing portion can suppress the deformation of the rear portion of the vehicle 10 at the time of a rear collision of the vehicle 10.

Further, in the embodiment described above, the upper portion of the dash panel 62 and the curved reinforcement 66 constitute the connecting portion 70 having a closed section structure. However, the disclosure is not limited to this. For example, a similar effect can be achieved by providing the dash panel 62 with a substantially cylindrical reinforcing member and connecting the front wall portion 14 and the side wall portion 16 by the reinforcing member. In this case, the substantially cylindrical reinforcing member is an example of the "connecting portion" of the disclosure.

Further, in the above embodiment, the vehicle seat 26 on which the driver can sit is provided in the front portion of the vehicle 10. However, the disclosure is not limited to this, and the seat of the driver may not necessarily be provided. In this case, the vehicle performs the autonomous driving only, and the vehicle seat 26 may be a seat on which a general occupant can sit.

Furthermore, in the embodiment described above, the pair of right and left functional component housing portions is provided with the vehicle seat 26 interposed therebetween. However, the disclosure is not limited to this, and the functional component housing portion may be provided only on one side in the vehicle width direction. For example, as shown in FIG. 2, the functional component housing portion 60 may be provided on the right side of the vehicle and the functional component housing portion may not necessarily be provided on the left side of the vehicle. In this case, a member such as a reinforcing member having a closed section structure that has the same function as that of the connecting portion 70 may be provided on the left side of the vehicle, and the front wall portion 14 and the side wall portion 16 may be connected by the reinforcing member.

What is claimed is:

1. A vehicle frame structure, comprising:
    a front wall portion and a rear wall portion that are respectively provided in a front end portion and a rear end portion of a vehicle and that extend in a vehicle width direction and a vehicle up-down direction so as to separate a vehicle cabin from an exterior of the vehicle cabin;
    a side wall portion extending in a vehicle front-rear direction between an end portion of the front wall portion and an end portion of the rear wall portion in the vehicle width direction so as to separate the vehicle cabin from the exterior of the vehicle cabin; and
    a connecting portion including a first end portion and a second end portion, and having a closed section structure that is curved so as to protrude inward in the vehicle width direction and inward in the vehicle front-rear direction when viewed in a plan view, the first end portion connected to an inner side of one of the front wall portion or the rear wall portion in the vehicle front-rear direction, and the second end portion connected to an inner side of the side wall portion in the vehicle width direction.

2. The vehicle frame structure according to claim 1, wherein:
    at least one of the front wall portion or the rear wall portion is provided with a reinforcing portion that has a closed section structure and extends in the vehicle width direction;
    the side wall portion is provided with a side reinforcing portion that has a closed section structure and extends in the vehicle front-rear direction; and
    the connecting portion includes the first end portion connected to the reinforcing portion and the second end portion connected to the side reinforcing portion.

3. The vehicle frame structure according to claim 1, wherein the connecting portion is disposed in a front portion of the vehicle, and connects the front wall portion provided in the front end portion of the vehicle and the side wall portion.

4. The vehicle frame structure according to claim 3, wherein the connecting portion includes a pair of connecting portions provided on respective sides of the vehicle in the vehicle width direction with a vehicle seat interposed between the pair of connecting portions.

5. The vehicle frame structure according to claim 1, further comprising:
    a functional component of the vehicle housed in an area that is surrounded by the one of the front wall portion or the rear wall portion, the side wall portion, and the connecting portion connected to the one of the front wall portion or the rear wall portion.

6. The vehicle frame structure according to claim 1, wherein
    the connecting portion includes a dash panel having a substantially arc-shaped curved surface extending from the inner side of said one of the front wall portion or the rear wall portion facing the vehicle front-rear direction to the inner side of the side wall portion facing the vehicle width direction.

7. The vehicle frame structure according to claim 6, wherein
    the connecting portion further includes a curved reinforcement at an upper end portion of the dash panel, wherein the curved reinforcement is curved along the substantially arc-shaped curved surface of the dash panel.

* * * * *